INVENTOR.
HAROLD V. HANSEN
BY
ATTORNEYS

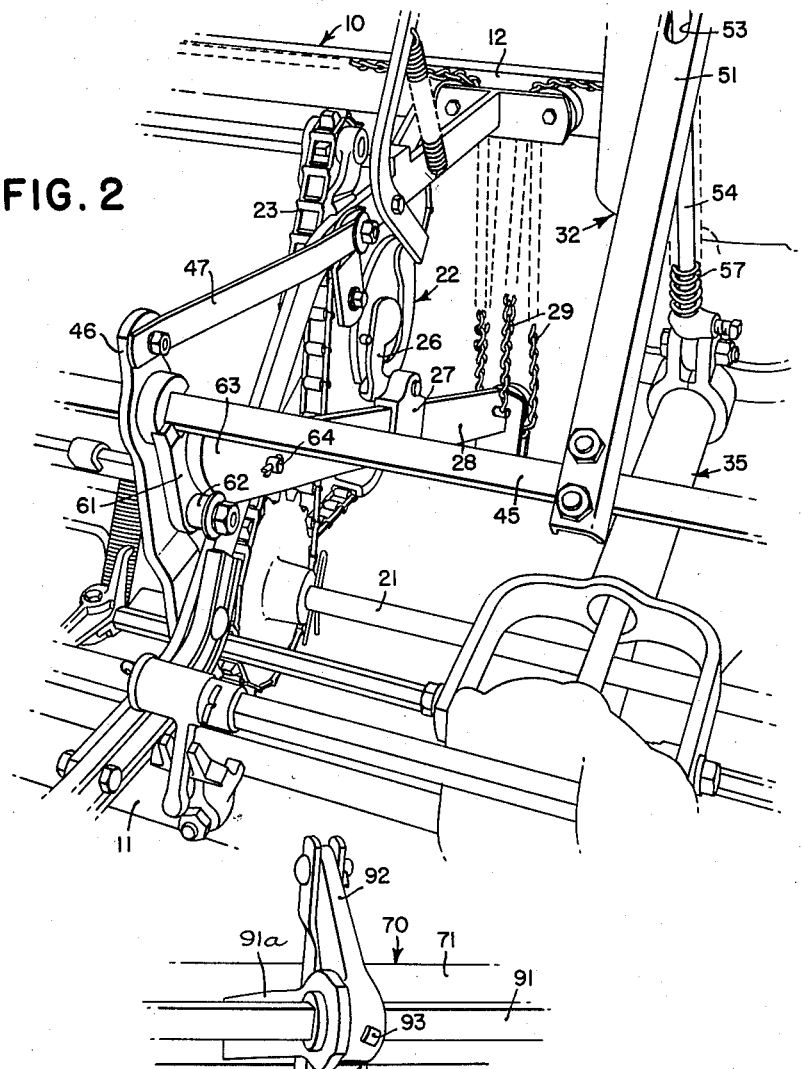
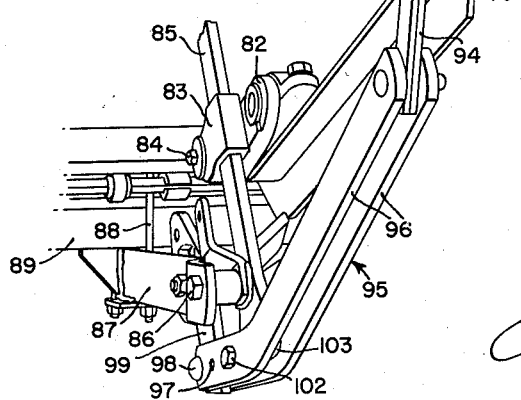
FIG. 2
FIG. 4
INVENTOR.
HAROLD V. HANSEN
BY
ATTORNEYS

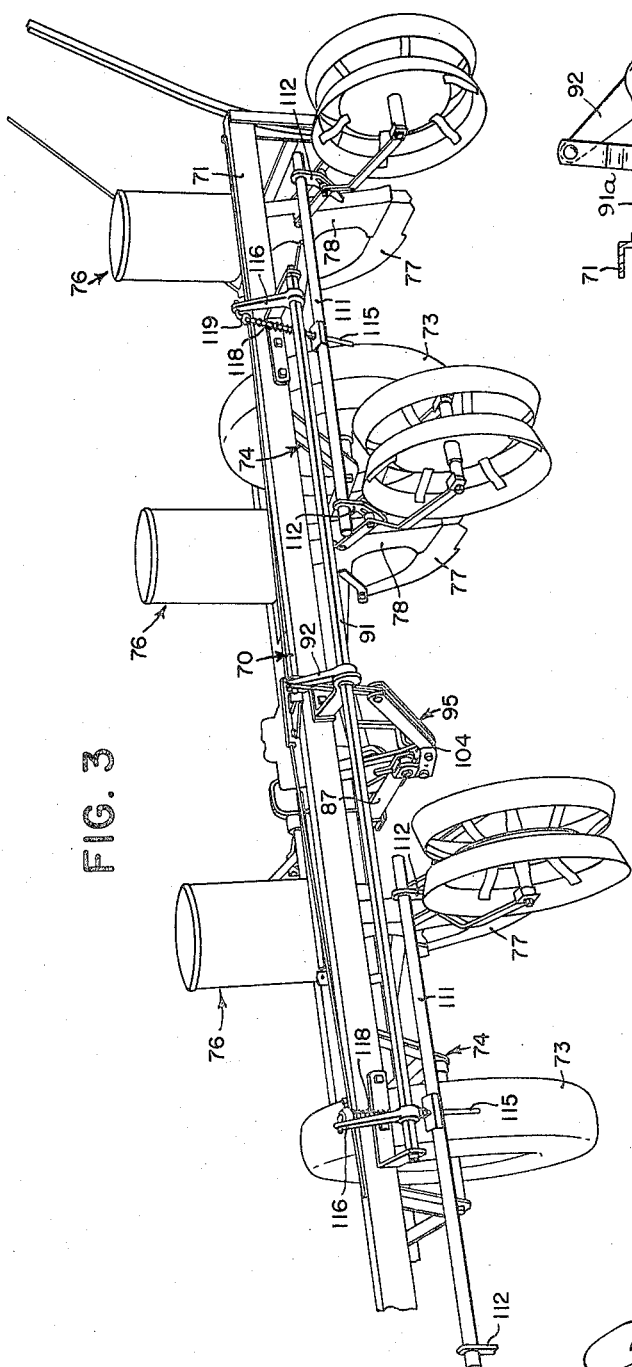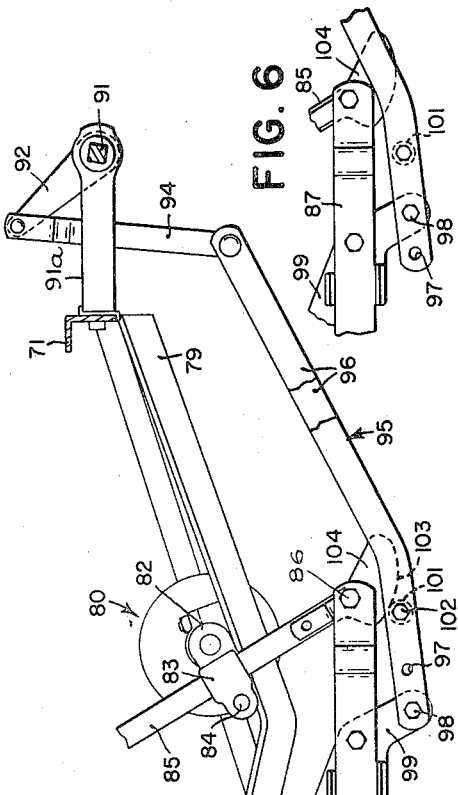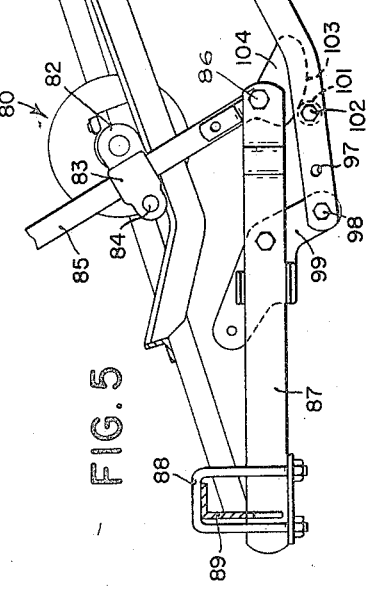

United States Patent Office 2,859,678
Patented Nov. 11, 1958

2,859,678

PRESSURE-APPLYING MEANS FOR PLANTERS

Harold V. Hansen, Hillsdale, Ill., assignor, by mesne assignments, to Deere & Company, a corporation of Delaware Application September 24, 1954, Serial No. 458,174

9 Claims. (Cl. 97—46.73)

The present invention relates generally to agricultural implements and more particularly to implements of the ground contacting or ground working type. For the purpose of illustrating the principles of the present invention, I have shown the same as incorporated in a corn planter.

The object and general nature of the present invention is the provision of a spring pressure device incorporated, or adapted to be incorporated, in an implement of the above mentioned type, whereby the implement is especially adapted for use under conditions where it is difficult to get the desired penetration of the ground entering tool means, because of soil characteristics or other factors.

A further feature of the present invention is the provision of an implement having a spring pressure device so constructed and arranged that down pressure may be applied to the ground engaging or ground contacting tool means when the latter are lowered in operating position but the pressure is released when the ground engaging means is raised, whereby no additional load is placed on the power lift clutch or other raising means.

These and other objects and advantages of the present invention will be apparent to those skilled in the art after a consideration of the following detailed description, taken in conjunction with the accompanying drawings, in which:

Figure 2 is a view similar to Figure 1, showing the positions the parts assume when the pressure is released and the ground working tool means raised.

Figure 3 is a perspective view taken from the rear, showing the present invention as incorporated in a four-row planter.

Figure 4 is a fragmentary perspective view of the parts connecting the pressure applying means with the power lift clutch of the four-row planter shown in Figure 3.

Figure 5 is a side view of the parts shown in Figure 4.

Figure 6 is a fragmentary side view of certain of the parts shown in Figure 5, illustrating the inoperative position of the pressure-applying mechanism.

Figure 1:
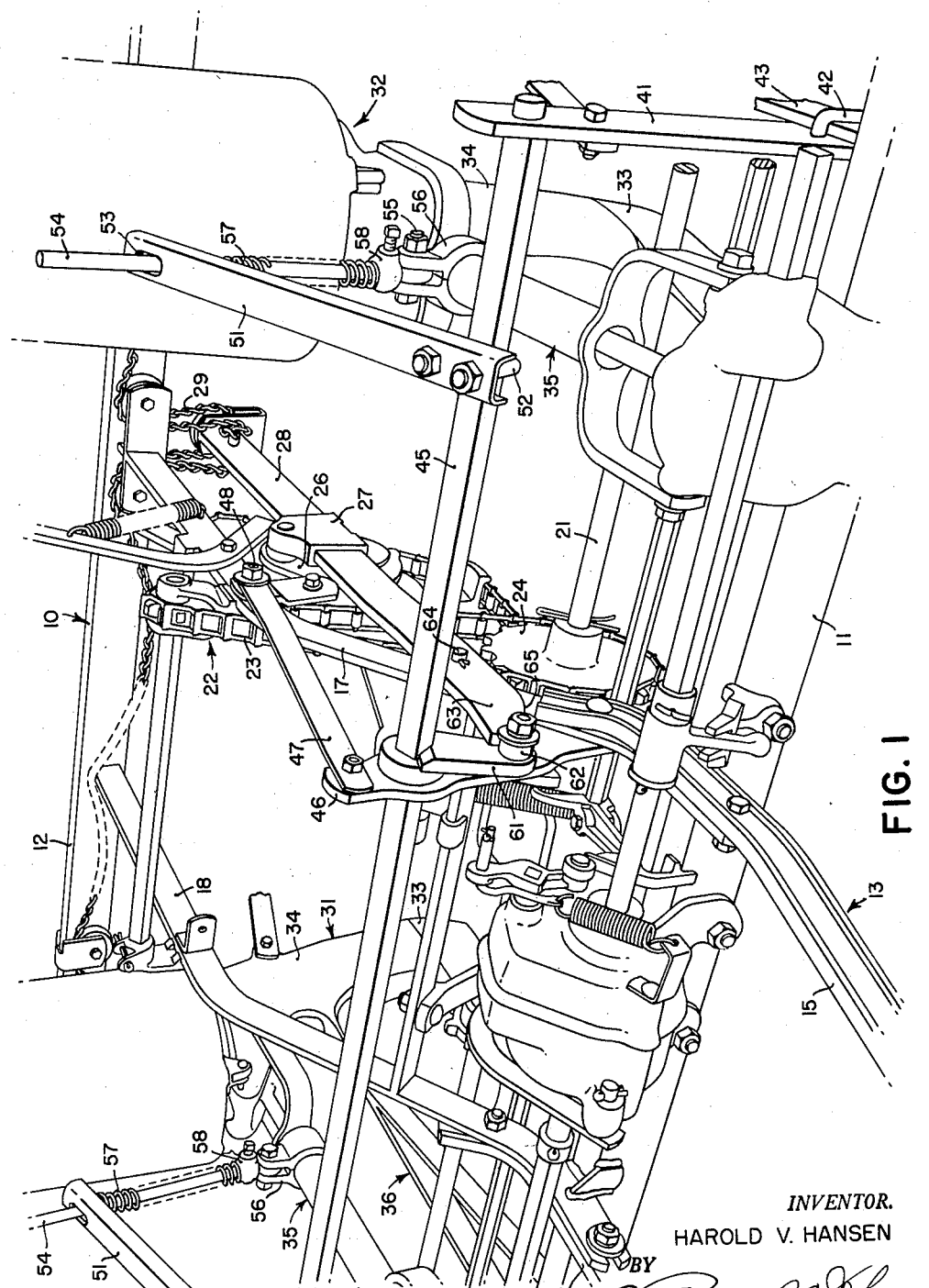
Figure 1 is a perspective view, fragmentary in nature, showing the present invention as incorporated in a two-row corn planter, the spring pressure device being shown in its pressure-applying position.

Referring first to Figure 1, the two-row planter in which the principles of the present invention have been incorporated is shown as comprising frame means 10 that includes a front sill bar 11, preferably in the form of an angle, and a rear sill bar 12, the frame 10 extending generally transversely relative to the line of travel and including a front draft frame 13 that includes generally fore-and-aft extending bars 15 and 16, with bar sections 17 and 18 affixed to the generally central portions of the sill bars 11 and 12.

The frame 10 is supported on ground wheels (not shown) that are connected to drive a jack shaft 21, and a self-interrupting power lift clutch unit 22 is connected by a drive chain 23 with a gear 24 on the shaft 21 so as to be actuated thereby. The clutch mechanism 22 is of the general type shown and claimed in U. S. Patent 2,376,464, issued May 22, 1945 to C. H. White, to which reference may be made if necessary. In the case of the two-row planter shown in Figure 1, the power lift clutch mechanism includes a crank member 26 that is connected through a slide member 27 with a lift arm 28 that extends generally horizontally and at its rear end there is means receiving chains 29 by which right- and left-hand planting units 31 and 32 may be raised and lowered. Each of the planting units includes a shoe type furrow opener 33 connected to a shank 34, each shank being connected with the front sill bar 11 through drag bar means in the form of upper and lower link means 35 and 36, the left-hand lower link being omitted in Figure 1 for purposes of clarity.

The spring pressure attachment, with which the present invention is particularly concerned, includes the structure now to be described. A pair of end brackets 41, only one of which is shown in Figure 1, is fixed to the front sill bar 11 by any suitable means, such as a U-bolt 42 carried by one of the planter wheel frame bars 43, the brackets 41 serving as bearings for receiving the rounded end portions of a transversely extending rockshaft 45. The rockshaft 45 is also rockably supported in a center bracket 46 that is fixed at its lower end in any suitable way to the bar 11 and reenforced by a center brace 47, the front end of which is bolted to the bracket 46 and the rear end of which is bolted, as at 48, to the left-hand draft frame section 17. A pair of pressure arms 51 are connected by U-bolts 52 to the rockshaft 45 and are slotted, as at 53, at their rear ends to slidably receive the associated pressure arm 54, the lower end of which is pivoted, as at 55, to a collar 56 fixed to the associated upper drag bar link 35. Each pressure rod 54 carries a cushioning spring 57, the lower end of which bears against an adjustable set screw collar 58 on the lower portion of the rod 54. The rockshaft is operated from the power lift arm 28 by means of a rockshaft arm 61 that is fixed to the rockshaft 45 adjacent the center bracket 46. The lower end of the arm 61 carries a roller 62 that is adapted to be contacted by a cam section 63 that is formed on or carried by the front end portion of the lift arm 28 forwardly of the pivot 64 that connects the power lift actuated arm 28 to the frame bar 17. The cam section 63 includes a lower rounded portion 65 that forms the active section of the cam 63. The shape of the cam edge 65 is such that when the furrow openers 33 are lowered, as by the upward movement of the rear end of the lift arm 28, the rounded cam edge 65 engages the roller 64 and forces the lower end of the arm 61 forwardly. This movement of the arm 61 rocks the shaft 45 in a direction to force the rear ends of the pressure arms 51 downwardly thus compressing the springs 57 and acting through the latter to apply down pressure to the planting units 32 through the upper link 35 so as to insure proper penetration of the furrow openers 33.

It is to be noted that the spring pressure attachment of the present invention does not put any additional load on the power lift clutch unit 22, for when the shaft 45 is rocked to apply down pressure to the planter units, the clutch unit 22 is otherwise not under load, since the units 31 and 32 normally lower by gravity. Similarly, when the power lift unit 22 is actuated to raise the planting units 31 and 32, the cam section 63 moves away from the roller 62 and arm 61, and hence does not apply any additional load on the power lift clutch.

Figures 3 and 4 show the principles of the present invention as incorporated in a four-row corn planter that is somewhat closer in construction to the planter shown in White, 2,376,464, than the two-row planter referred to above. The four-row planter shown in Figures 3 and 4 incorporates a draft bar and frame construction quite similar to that described above, the frame of the four-row planter being indicated in its entirety by the reference numeral 70 and includes a rear sill bar 71 extending generally transversely and forming the rear portion of the frame 70, the latter being supported on a pair of ground wheels 73 connected with the planter frame 70 by wheel frames 74, substantially as shown in White, 2,376,464. The four-row planter of Figures 3 and 4 also includes four planting units 76, each including a furrow opener 77 and an associated shank 78, the latter being connected with the frame through parallel links similar to those mentioned above in connection with Figures 1 and 2. The four-row planter frame includes a fore-and-aft extending crossbar, preferably in the form of an angle 79 on which the power lift clutch unit 80 is mounted. The clutch unit 80, like the clutch unit 22 described above, includes a crank arm 82 to which a slide 83 is pivoted, as at 84. A power lift arm 85 is disposed within the slide 83 and pivotally connected by a pin 86, or other suitable means, to a bracket beam 87, the latter being fixedly secured, as by a U-bolt 88, to the front sill bar 89 of the four-row planter frame 70. The upper end of the power lift arm is connected through lift chains with the several shanks 78, whereby fore-and-aft movement of the upper end of the lift arm 85 serves to raise and lower the furrow openers into and out of transport and ground working positions, substantially as shown in the patent to White, 2,376,464.

The spring pressure attachment of the present invention, as incorporated in a four-row planter of the type shown in Figures 3 and 4, comprises a rearwardly disposed transverse rockshaft 91 rockably carried in a plurality of brackets 91a fixed to the rear side of the rear sill bar 71. An arm 92 is fixed, as by a set screw 93, or other suitable means, to the rockshaft 91 and has its outer or forward end connected by a link 94 to a generally fore-and-aft extending lever 95, preferably made up of a pair of flat bars 96, as best shown in Figures 4 and 5. The forward ends of the bars 96 are apertured, as at 97, to receive a pivot 98 by which the front end of the lever 95 is pivotally connected to a bracket 99 that is fixed to the rear portion of the fore-and-aft extending bracket 87. Thus, the lever 95 is swingably connected with the front sill bar 89 for generally up and down movement relative thereto. Between the bars 96, as best shown in Figure 5, a roller 101 is disposed, being mounted on a pin 102 carried by the bars 96. The roller 101 cooperates with a cam section 104 formed on or carried by the lower end of the lift arm 85. The cam section 104 is so shaped, having a roller engaging edge 103, that when the upper end of the lift arm 85 is swung rearwardly, as shown in Figure 3, downward pressure is applied against the roller 101, and this causes the rear end of the lever 95 to be swung downwardly. Downward movement of the rear end of the lever 95 acts through the link 94 to swing the forward end of the arm 92 downwardly. This rocks the shaft 91 in a direction to apply down pressure against the several furrow openers 77.

The means by which the aforesaid rocking movement of the shaft 91 applies down pressure to the several furrow opener units comprises a pair of evener pipers 111, one at each side of the planter. Each evener pipe is connected through apertured brackets 112 with the shanks of the planting units at that side of the tractor, and centrally, each is apertured to receive a pressure rod 115, the upper end of which is pivoted to the forward end of an arm 116 that is fixed to the associated end of the transverse rockshaft 91. A cushioning spring 118 is disposed between a collar 119 fixed to the upper portion of the associated rod 115, the lower end of the spring bearing directly against the associated evener part 111. Thus, whenever the downward movement of the forward end of the arm 92 rocks the shaft 91, the forward ends of the arms 116 are moved downwardly, and thus act through the cushioning springs 118 to apply down pressure to the associated furrow openers. Like the form of the invention shown in Figures 1 and 2, the power lift clutch unit is not called upon to perform the down pressure exerting action except during what might be termed the idle or furrow opener lowering phase of its cycle of operation.

Under certain conditions it may not be necessary to exert any down pressure on the furrow openers. To take care of this situation, the pivot 98 is removed from the forward openings 97, the lever 95 then swung forwardly a slight amount, sufficient to bring the rear openings 97 in alinement with the corresponding openings in the bracket 99, and then the pivot 98 is reinserted and secured. This disposes the roller 101 in such a position that it is not contacted by the lift arm 85 during the raising and lowering movements of the latter, and therefore the pressure exerting rockshaft 91 is not operated. This is shown in Figure 6.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. The combination with an agricultural implement having a plurality of ground engaging means and a power lift mechanism, including a movable part, for raising and lowering said ground engaging means, of a rockshaft rockably mounted on said implement and extending generally transversely of said plurality of ground engaging means, a plurality of arms fixed to said rockshaft and connected, respectively, to apply down pressure to said plurality of ground engaging means, means including a cam connected to move with said part, and means adapted to receive movement from said cam and to transmit said movement to said rockshaft to move all of said arms.

2. The combination with an agricultural implement having a ground engaging means and a power lift mechanism, including a movable part, for raising and lowering said ground engaging means, of a rockshaft rockably mounted on said implement, an arm fixed to said rockshaft and connected to apply down pressure to said ground engaging means, means including a cam connected to move with said part, a second arm fixed to said rockshaft, and means on the latter arm adapted to engage said cam so as to receive movement therefrom and to transmit said movement to said first arm for applying down pressure to said ground engaging means.

3. The combination with an agricultural implement of the type including ground engaging means adapted to be lowered by gravity into engagement with the ground and to be raised by power into a transport position, and power lift means having a movable part and connected to raise and lower said ground engaging means, of a spring pressure attachment for applying down pressure to said ground engaging means in the lower position of the latter, comprising a rockshaft detachably connected with said implement, spring cushioned means connecting said rockshaft with said ground engaging means, an arm pivotally mounted on the implement and connected to rock said rockshaft, and means including a cam connected to move with said part and disposed to engage said arm for rocking said shaft to apply down pressure to said ground engaging means when said power lift means is actuated to lower said ground engaging means.

4. The combination set forth in claim 3, further characterized by said power lift means including a self-interrupting clutch, and said combination also including a pivoted lift arm actuated by said clutch and carrying said cam at one end thereof, the other end being connected to raise and lower said ground engaging means.

5. The combination with an agricultural implement of the type including a generally transverse frame provided with front and rear sill bars and including ground engaging means, drag bar means connecting said ground engaging means with said front sill bar, and power lift means connected with said ground engaging means for raising and lowering the ground engaging means into and out of a transport position, of a spring pressure attachment comprising a rockshaft rockably mounted on one of said sill bars generally above said drag bar means and separate from said power lift means, spring cushioned arm means carried by said rockshaft and operatively connected with said ground engaging means for applying down pressure thereto upon movement of said rockshaft in one direction, and means actuated by said power lift means when lowering said ground engaging means for actuating said rockshaft in said one direction.

6. The combination with an agricultural implement of the type including a generally transverse frame provided with front and rear sill bars and including ground engaging means and power lift means connected therewith for raising and lowering the ground engaging means into and out of a transport position, of a spring pressure attachment comprising a rockshaft rockably mounted on one of said sill bars, spring cushioned arm means carried by said rockshaft and operatively connected with said ground engaging means for applying down pressure thereto upon movement of said rockshaft in one direction, and means actuated by said power lift means when lowering said ground engaging means for actuating said rockshaft in said one direction, said power lift means including a lift arm disposed in a generally vertical fore-and-aft extending plane and rockable about a generally transverse axis when the power lift means is actuated, means including cam means interconnecting said rockshaft with said power lift arm, said rockshaft being mounted on said front sill bar and said power lift arm extending generally in a fore-and-aft extending direction, and said cam means being carried at the forward end of said arm.

7. The combination with an agricultural implement of the type including a generally transverse frame provided with front and rear sill bars and including ground engaging means and power lift means connected therewith for raising and lowering the ground engaging means into and out of a transport position, of a spring pressure attachment comprising a rockshaft rockably mounted on one of said sill bars, spring cushioned arm means carried by said rockshaft and operatively connected with said ground engaging means for applying down pressure thereto upon movement of said rockshaft in one direction, and means actuated by said power lift means when lowering said ground engaging means for actuating said rockshaft in said one direction, said power lift means including a lift arm disposed in a generally vertical fore-and-aft extending plane and rockable about a generally transverse axis when the power lift means is actuated, means including cam means interconnecting said rockshaft with said power lift arm, said power lift arm means extending generally vertically and said cam means being disposed at the lower end of said power lift arm.

8. The combination set forth in claim 7, further characterized by said rockshaft being mounted on said rear sill bar and said cam means on said power lift arm being connected with said rockshaft through means including an arm on said rockshaft, a generally fore-and-aft extending lever adjusted to be operatively connected with said cam means, and a link connecting the rear end of said lever with said arm.

9. The combination with an agricultural implement having a plurality of ground engaging means and a power lift mechanism, including a movable part, for raising and lowering said ground engaging means, of a rockshaft rockably mounted on said implement and extending generally transversely of said plurality of ground engaging means, a plurality of arms fixed to said rockshaft and connected, respectively, to apply down pressure to said plurality of ground engaging means, means connected to move with said movable power lift part when movement of the latter lowers said ground engaging means, and means having a one way connection with the means that moves with said movable part for transmitting pressure applying movement to said rockshaft to move all of said arms.

References Cited in the file of this patent

UNITED STATES PATENTS

| | | |
|---|---|---|
| 1,960,268 | Kriegbaum et al. | May 29, 1934 |
| 2,127,579 | Altgelt | Aug. 23, 1938 |
| 2,217,866 | Hipple | Oct. 15, 1940 |
| 2,376,464 | White | May 22, 1945 |
| 2,520,345 | Starr | Aug. 29, 1950 |

FOREIGN PATENTS

| | | |
|---|---|---|
| 3,114 | Great Britain | Dec. 11, 1897 |